Patented Apr. 14, 1953

2,634,826

UNITED STATES PATENT OFFICE 2,634,826

PROCESS FOR THE SEPARATION OF CARBONDIOXIDE AND AMMONIA

Charles Cramer, Vaduz, Liechtenstein, assignor to Inventa A-G. Fuer Forschung and Patentverwertung, Zurich, Switzerland No Drawing. Application February 8, 1951, Serial No. 210,100. In Switzerland January 10, 1951

4 Claims. (Cl. 183—115)

This invention relates to an improved method for the separation of gas mixtures and more particularly to the separation of gas mixtures containing carbondioxide and ammonia.

It is a fact known in the art that solutions of various ammonium salts, as for instance ammonium nitrate, exhibit differences as regards absorptive power in respect to carbon dioxide and hydrogen sulphide and ammonia.

Krase and Haetherington have found that the difference in absorptive power of said solution varies with the temperature. They pointed out the possibility of exploiting this fact for the separation of gas mixtures which, for instance, contain carbon dioxide and ammonia.

It would appear, however, that a technical realization of this problem has not yet been successfully achieved.

The inventor has discovered that urea salts, e. g. urea nitrate, also possess absorptive characteristics similar to those of the ammonium salts which may be successfully used for the separation of carbon dioxide or hydrogen sulphide and ammonia.

It is an object of this invention, therefore, to provide a new and improved method for the separation of gas mixtures especially adapted for the processing and separation of the residual gases resulting from the pressure synthesis of urea from carbon dioxide and ammonia.

The gases of urea synthesis obtained from the carbamate decomposition and distillation always contain a certain quantity of entrained urea which is retained in the absorption solution so that the absorption solution is enriched with urea.

If a salt solution other than urea or urea salts is employed as absorptive means, the urea constitutes a foreign body therein. The absorption relations are greatly changed and deteriorated in this case so that the solution must be replaced frequently.

The inventor has found that by employing a urea salt solution, the accretion of urea is not a disturbing factor. It may be removed continuously and in a pure form by crystallization. In this manner a further portion of pure urea is recovered which hitherto was lost.

According to this invention, therefore, an aqueous absorbing solution is used containing a water soluble urea salt.

By processing carbamate with a solution of this kind the total yield of the urea synthesis is thus improved.

*Example*

An absorption solution is used containing 35% to 55% by weight of urea nitrate.

The absorptive separation may be carried out both at pressures around normal as well as at pressures increased up to 10 atmospheres.

Each pressure has its optimum absorption or separation temperature which lies between 70° and 120° C. for normal pressure, and between 90° and 160° C. for increased pressures.

While I have described in the above example a specific embodiment of this invention, it should be understood that I do not limit myself to any particulars.

Changes and modifications may be made without altering the principle of this invention.

I claim:

1. A process for separating, by selective absorption, ammonia from carbon dioxide from gaseous mixtures containing said components which comprises effecting the selective absorption of ammonia by means of an aqueous solution of urea nitrate.

2. A process according to claim 1 wherein the solution used for absorption of ammonia contains 35% to 55% by weight of urea nitrate.

3. The process set forth in claim 1 wherein the absorption is performed under normal pressure and at temperatures of between 70° and 120° C.

4. The process set forth in claim 1 wherein the absorption is effected at higher pressure of up to 10 atmospheres and temperatures between 90° and 160° C.

CHARLES CRAMER.

References Cited in the file of this patent

FOREIGN PATENTS

| Number | Country | Date |
|---|---|---|
| 335,913 | Great Britain | Sept. 29, 1930 |
| 337,394 | Great Britain | Oct. 29, 1930 |